(12) United States Patent
Yaguchi et al.

(10) Patent No.: US 10,843,589 B2
(45) Date of Patent: Nov. 24, 2020

(54) LOCKING DEVICE FOR VEHICLE SEAT

(71) Applicant: TOYOTA BOSHOKU KABUSHIKI KAISHA, Aichi-ken (JP)

(72) Inventors: Daishi Yaguchi, Aichi-ken (JP); Shun Fujishiro, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 130 days.

(21) Appl. No.: 16/284,398

(22) Filed: Feb. 25, 2019

(65) Prior Publication Data
US 2019/0263293 A1 Aug. 29, 2019

(30) Foreign Application Priority Data
Feb. 26, 2018 (JP) ................. 2018-031827

(51) Int. Cl.
| | | |
|---|---|---|
| B60N 2/005 | (2006.01) | |
| B60N 2/30 | (2006.01) | |
| B60N 2/28 | (2006.01) | |
| B60N 2/015 | (2006.01) | |

(52) U.S. Cl.
CPC ......... *B60N 2/005* (2013.01); *B60N 2/01516* (2013.01); *B60N 2/28* (2013.01); *B60N 2/3097* (2013.01)

(58) Field of Classification Search
CPC .... B60N 2/005; B60N 2/015; B60N 2/01508; B60N 2/01516; B60N 2/28; B60N 2/30; B60N 2/3097; B60N 2/366
USPC ........................................... 296/65.01, 65.03
See application file for complete search history.

(56) References Cited

U.S. PATENT DOCUMENTS

| | | | | |
|---|---|---|---|---|
| 6,733,078 | B1 * | 5/2004 | Zelmanov ............ | B60N 2/2245 292/201 |
| 10,358,071 | B2 * | 7/2019 | Rapedius ................. | B60N 2/36 |
| 2007/0080554 | A1 * | 4/2007 | Willing ................... | B60N 2/919 296/65.03 |
| 2013/0328372 | A1 * | 12/2013 | Suzumura ................ | B60N 2/20 297/378.13 |
| 2014/0239661 | A1 * | 8/2014 | Thiex .................. | B60N 2/01583 296/65.03 |
| 2018/0050611 | A1 * | 2/2018 | Vedder .................. | E05B 85/243 |
| 2018/0290565 | A1 | 10/2018 | Tone et al. | |
| 2020/0056409 | A1 * | 2/2020 | Ban ........................ | B60N 2/366 |

FOREIGN PATENT DOCUMENTS

| | | |
|---|---|---|
| JP | 2017-87930 | 5/2017 |
| WO | WO-2019125327 A2 * 6/2019 ............. E05B 77/40 |

* cited by examiner

*Primary Examiner* — Jason S Daniels
(74) *Attorney, Agent, or Firm* — Greenblum & Bernstein, P.L.C.

(57) ABSTRACT

A locking device for a vehicle seat including: a striker and a lock mechanism including: a base plate; a hook supported rotatably by a hook shaft to the base plate and capable of forming a locked state and an unlocked state; a pawl supported rotatably by a pawl shaft to the base plate; and a cam supported rotatably by the pawl shaft to the base plate, and the cam is rotationally biased by a first torsion coil spring, and the pawl is rotationally biased by a second torsion coil spring, and the coil of the second torsion coil spring has a larger diameter and a smaller length in a central axis direction of the coil than the coil of the first torsion coil spring, and one end of the first torsion coil spring is provided on a radially outer side than the coil of the second torsion coil spring.

6 Claims, 7 Drawing Sheets

LOCKING DEVICE FOR VEHICLE SEAT

CROSS-REFERENCE TO RELATED APPLICATIONS

This application claims priority from Japanese Patent Application No. 2018-031827 filed on Feb. 26, 2018, the entire contents of which are incorporated herein by reference.

TECHNICAL FIELD

The disclosure relates to a locking device for a vehicle seat.

BACKGROUND

Conventionally, as a locking device for locking a vehicle seat, such as an automobile seat, by a lock mechanism with respect to a striker provided on a floor, a locking device disclosed in JP-A-2017-87930 is known. The lock mechanism in the locking device includes a base plate, a plate-shaped hook rotatably supported by the base plate, a plate-shaped pawl rotatably supported by the base plate, and a plate-shaped cam rotatably supported by the base plate. The base plate is fixed to an automobile seat, and includes a recess capable of receiving a striker. When pushed by an operation in which the striker is received in the recess of the base plate, the hook rotates against a rotationally biasing force of a compression coil spring that is disposed between the hook and the pawl, and turns a part thereof to a rear surface portion of the striker, so as to close the recess. When the hook has closed the recess, the pawl rotates upon receiving the biasing force of the compression coil spring, and thereby engages with the hook so as to stop rotation of the hook. When the pawl engages with the hook, the cam comes into contact with a part of the hook upon receiving a biasing force of a torsion coil spring, thereby further rotating the hook against the rotationally biasing force of the compression coil spring, so as to suppress rattling of the lock mechanism with respect to the striker. This state is a locked state of the locking device.

In the above-described locking device for an automobile seat, in order to efficiently raise the rotationally biasing force, the compression coil spring disposed between the hook and the pawl is generally disposed at a position separated from both a rotation axis with respect to the base plate of the hook and a rotation axis with respect to the base plate of the pawl. As a result, increase in the size of the hook and the pawl causes increase in the size of the base plate that rotatably supports the hook and the pawl, thereby causing a problem of increase in size of the locking device. In order to avoid this problem, it has also been considered to rotationally bias the hook, the pawl, and the cam with torsion coil springs disposed respectively in accordance with rotation axes thereof. However, in a case where the rotation axes of the pawl and the cam are the same, when a torsion coil spring for rotationally biasing the pawl and a torsion coil spring for rotationally biasing the cam are disposed so as to prevent interference with each other, the diameter of either one of the torsion coil spring has to be increased, and thus it is difficult to suppress increase in the size of the locking device.

SUMMARY

In view of such a demand, the problem to be solved by the disclosure is to devise to a rotationally biasing structure of a hook, a pawl, and a cam with respect to a base plate, and to thereby provide a locking device for a vehicle seat which is capable of suppressing size increase of the locking device.

According to an aspect of the disclosure, there is provided a locking device for a vehicle seat capable of holding a vehicle seat with respect to a vehicle body, the locking device including: a striker provided on one of the vehicle body and the vehicle seat, and a lock mechanism provided on another of the vehicle seat and the vehicle body, and the lock mechanism includes: a base plate having a recess capable of receiving the striker; a hook supported rotatably by a hook shaft with respect to the base plate and capable of forming a locked state in which the hook and the recess hold the striker and an unlocked state in which the hook and the recess do not hold the striker, the hook being rotationally biased in a direction of forming the unlocked state; a pawl supported rotatably by a pawl shaft with respect to the base plate and maintaining the hook in the locked state by engaging with the hook, the pawl being rotationally biased in a direction of engaging with the hook; and a cam supported rotatably by the pawl shaft with respect to the base plate and configured to rotate so as to press the hook in the locked state in a locking direction, and one of the pawl and the cam is rotationally biased by a first torsion coil spring, a central axis of a coil of the first torsion coil spring being the pawl shaft, and another of the cam and the pawl is rotationally biased by a second torsion coil spring, a central axis of a coil of the second torsion coil spring being the pawl shaft, and the coil of the second torsion coil spring has a larger diameter than the coil of the first torsion coil spring and the coil of the second torsion coil spring has a smaller length in a direction of the central axis of the coil than the coil of the first torsion coil spring, and at least one end of the first torsion coil spring is provided on a radially outer side than the coil of the second torsion coil spring.

DETAILED DESCRIPTION

FIGS. 1 to 7 show an embodiment of the disclosure. This embodiment is an example in which the disclosure is applied to an automobile seat 1. In each drawing, arrows indicate directions of the automobile and the automobile seat 1 when the automobile seat 1 is installed to a floor F of the automobile. In the following description, description relating to directions uses these directions as a reference. The automobile seat 1 is a rear seat of the automobile. Here, the automobile seat 1 and the floor F respectively correspond to the "vehicle seat" and the "vehicle body" in claims.

Figure 1:
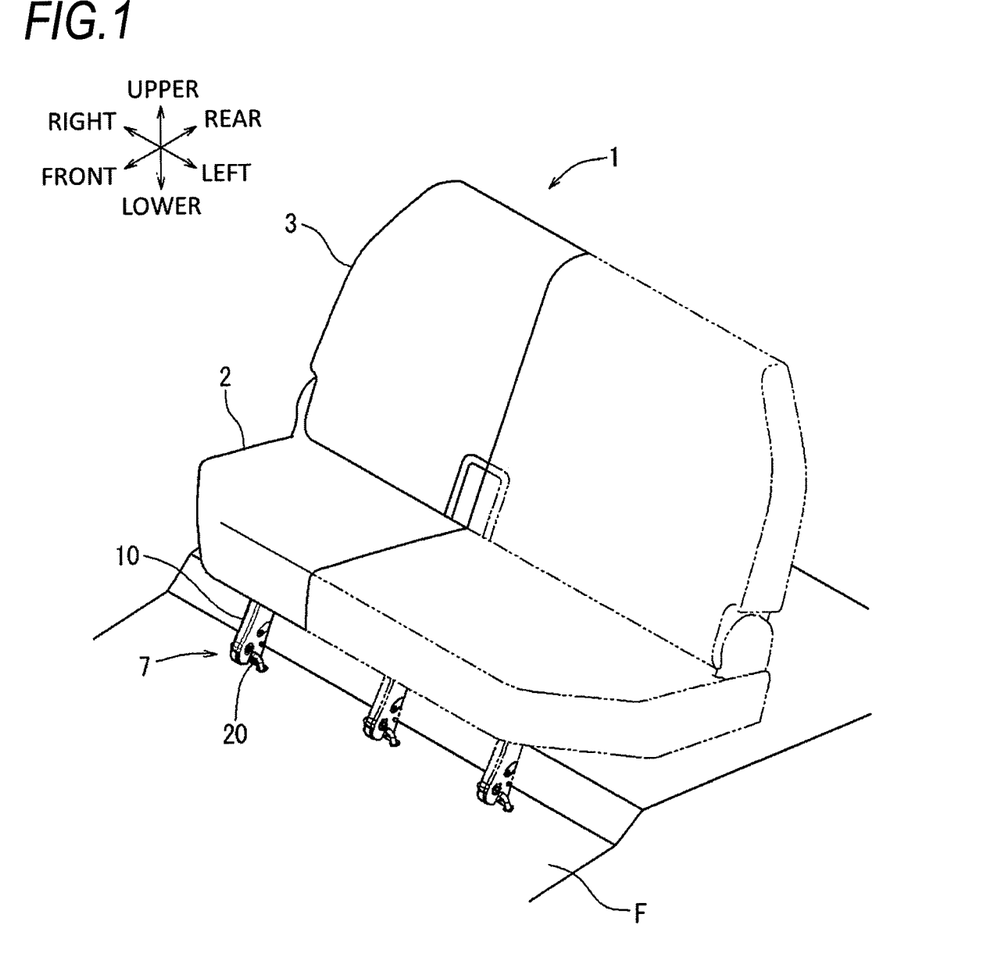
FIG. 1 is a perspective view of an automobile seat in use that is installed with a locking device according to an embodiment of the disclosure.

FIG. 1 is a perspective view of the automobile seat 1 that is installed with a locking device 7 as an embodiment of the disclosure as viewed obliquely from the front, and shows the automobile seat 1 in a state where an occupant is seated. As shown in FIG. 1, the automobile seat 1 is a single seat on a right part of a bench seat allowing three people to sit in a left-right direction, and includes a seat cushion 2 supporting buttocks and thighs of a seated occupant and a seat back 3 supporting a waist and a back of the seated occupant. The seat cushion 2 is removably connected to the floor F by one front leg 8 and two rear legs (not shown). Specifically, the front leg 8 can be engaged and disengaged from a front striker 20 fixed to the floor F, and the rear legs can be engaged and disengaged from rear strikers (not shown) fixed to the floor F. The locking device 7 is configured by the front leg 8 and the front striker 20. A lower end of the seat back 3 is installed to a rear end of the seat cushion 2 rotatably about an axis extending in a left-right direction. When the seat back 3 is in an upright position with respect to the seat cushion 2 as shown in FIG. 1, the locking device 7 is in a locked state. When the seat back 3 is laid down and becomes overlapped with respect to the seat cushion 2, the locking device 7 comes into an unlocked state. That is, engagement of the front leg 8 with respect to the front striker 20 is released. Further, when the seat back 3 is laid down and becomes overlapped with respect to the seat cushion 2, engagement of the rear legs with respect to the rear strikers is released. Thereby, the automobile seat 1 is configured to be released from connection with the floor F in a state where the seat back 3 is overlapped with respect to the seat cushion 2, and configured to be housed in a housing recess provided on the floor F on the rear side by a link mechanism (not shown). Here, the locking device 7 corresponds to the "locking device for a vehicle seat" in claims, and the front striker 20 corresponds to the "striker" in claims.

Figure 2:
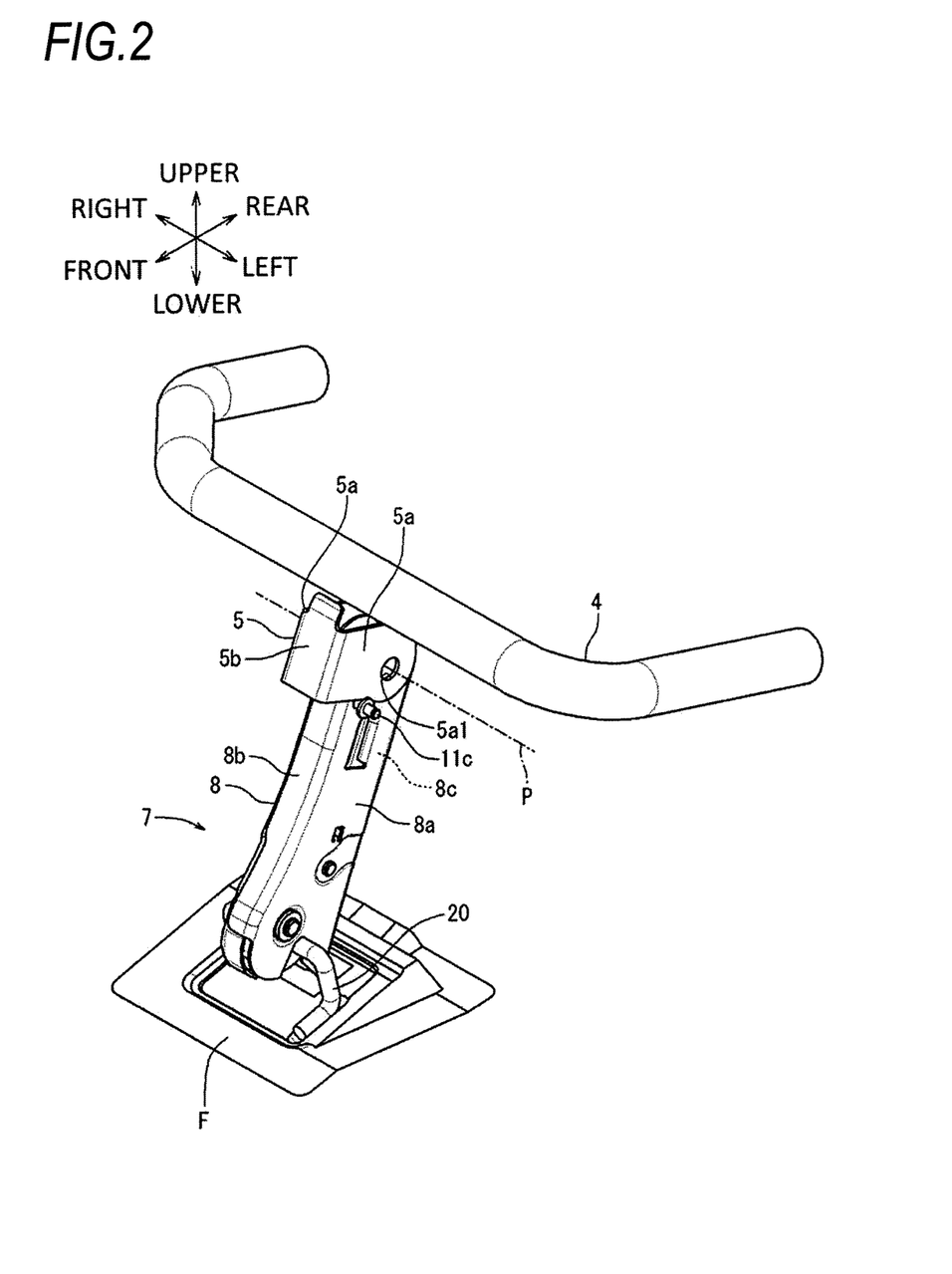
FIG. 2 is a perspective view of a leg portion of the automobile seat installed with the locking device according to the embodiment.

FIG. 2 is a perspective view showing a situation in which the locking device 7 in FIG. 1 is disposed on a front end side of a cushion frame 4 of the seat cushion 2. A bracket 5 is provided on a lower side of the front end of the cushion frame 4. The bracket 5 is provided with shaft holes 5*a*1 which are centered on a leg rotation axis P extending in the left-right direction and face each other in the left-right direction. Specifically, the bracket 5 has a cross section formed into a substantially U-shape opened rearward in a top view, and has a pair of side surfaces 5*a* extending in a front-rear direction and a bottom surface 5*b* connecting front ends of the pair of side surfaces 5*a*. The shaft holes 5*a*1 are respectively formed on the pair of side surfaces 5*a*. The front leg 8 is formed into a substantially prismatic shape extending in an upper-lower direction. The front leg 8 has a pair of sidewalls 8*a* facing each other on the left and the right and extending in the upper-lower direction, a front wall 8*b* connecting front ends of the pair of sidewalls 8*a*, and a rear wall 8*c* connecting rear ends of the pair of sidewalls 8*a*. Upper ends of the pair of sidewalls 8*a* are disposed between the pair of side surfaces 5*a* of the bracket 5 so as to be rotatable about the leg rotation axis P in the front-rear direction. A lower end of the front leg 8 is fixed to the floor F and is engageable and disengageable with respect to the front striker 20 extending in the left-right direction.

Figure 3:
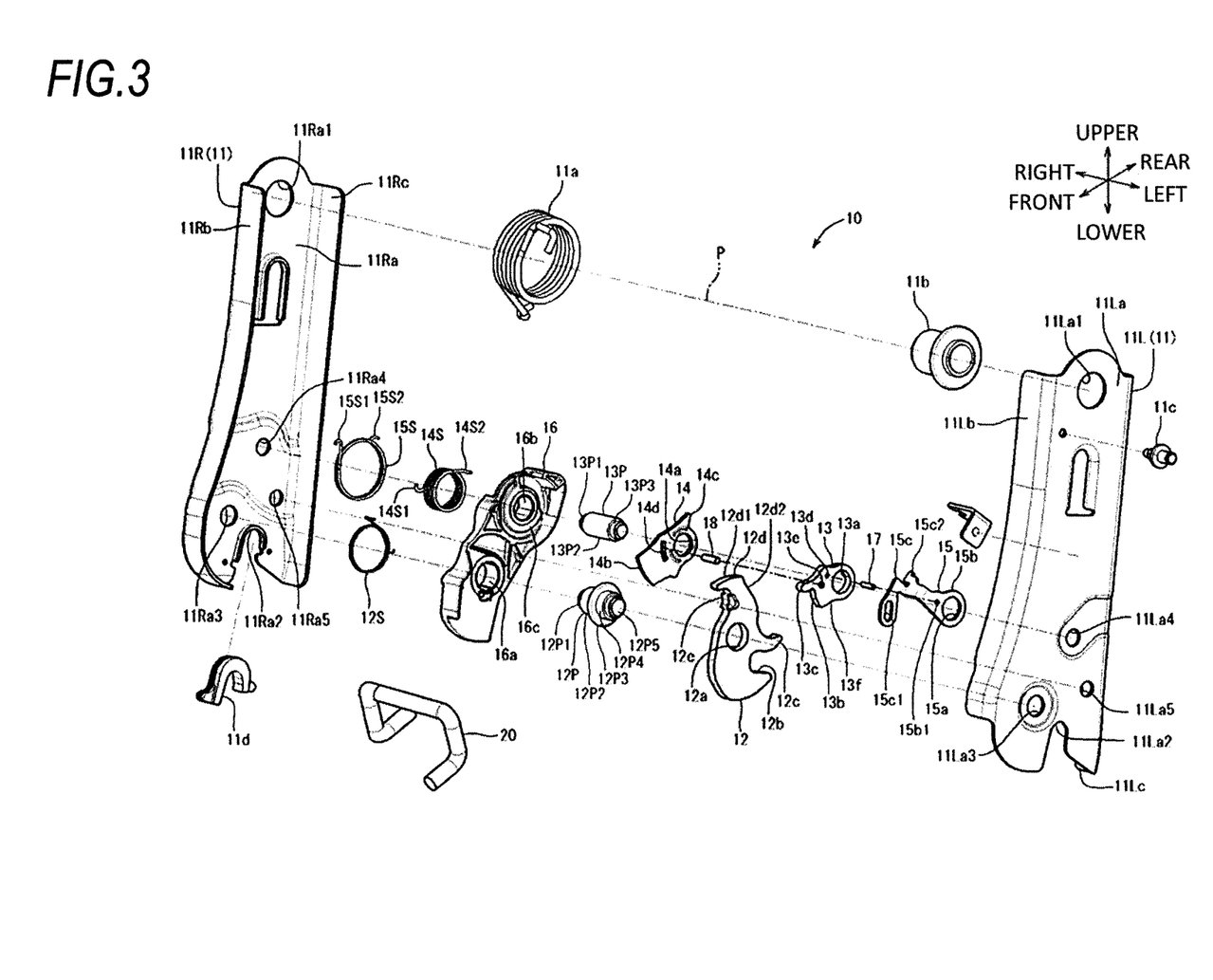
FIG. 3 is an exploded perspective view of the leg portion installed with the locking device according to the embodiment.
Figure 4:
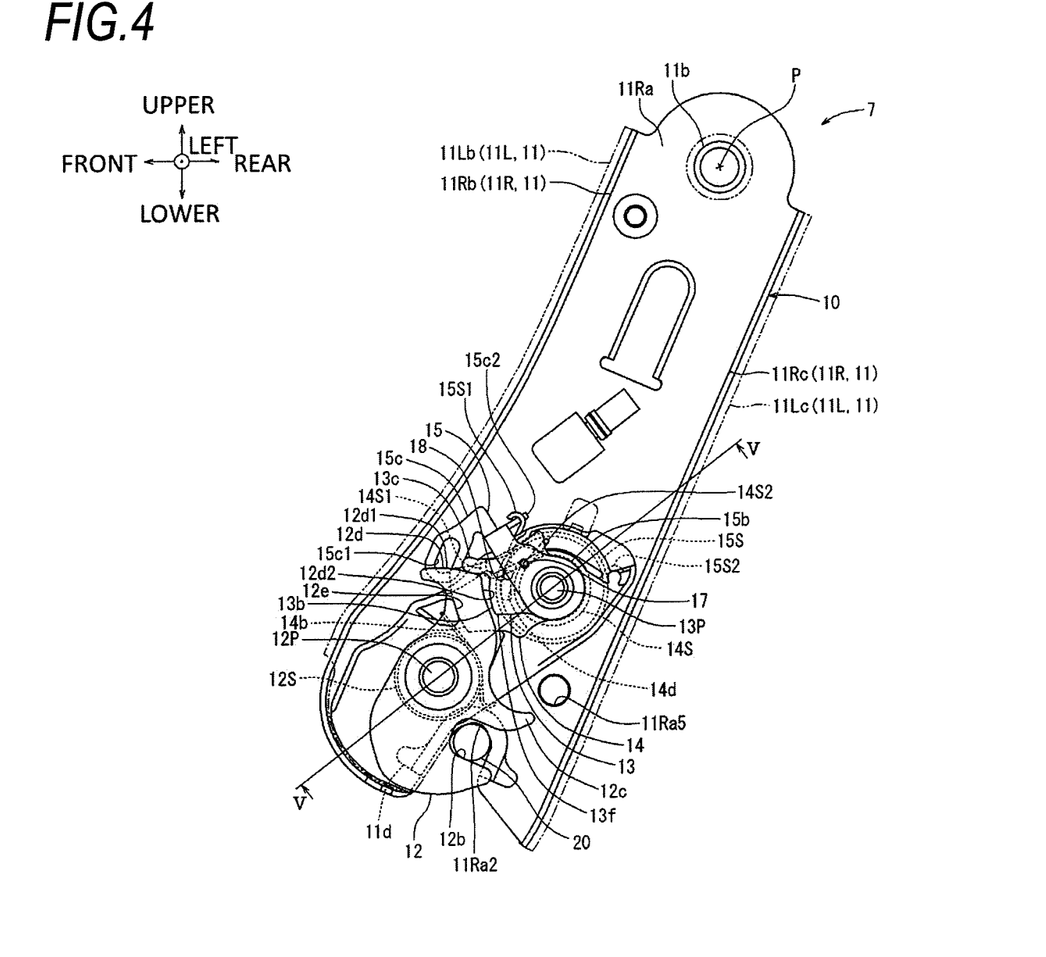
FIG. 4 is a side view of the locking device in a locked state of the embodiment, and a base plate on the front side is indicated by a two-dot chain line.
Figure 5:
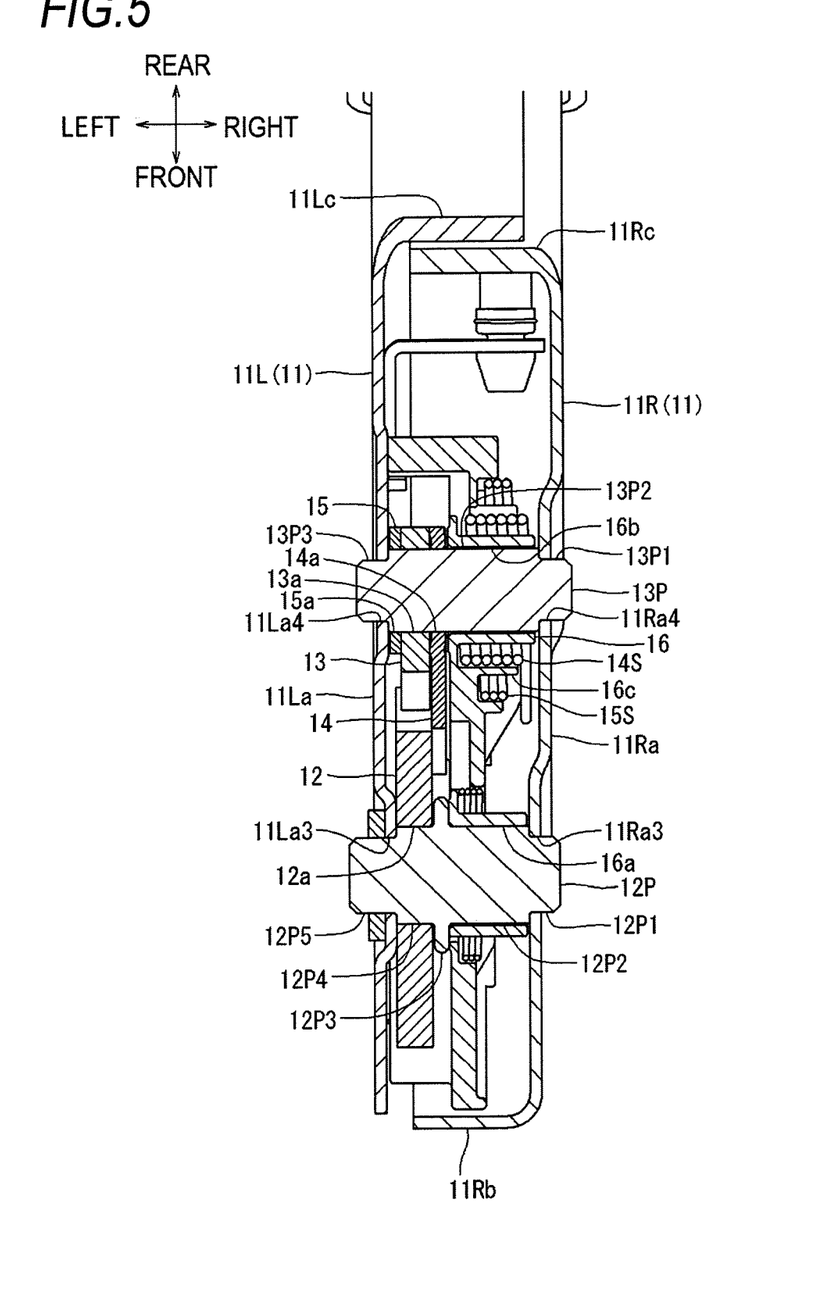
FIG. 5 is a cross-sectional view of FIG. 4 taken along a line V-V.
Figure 6:
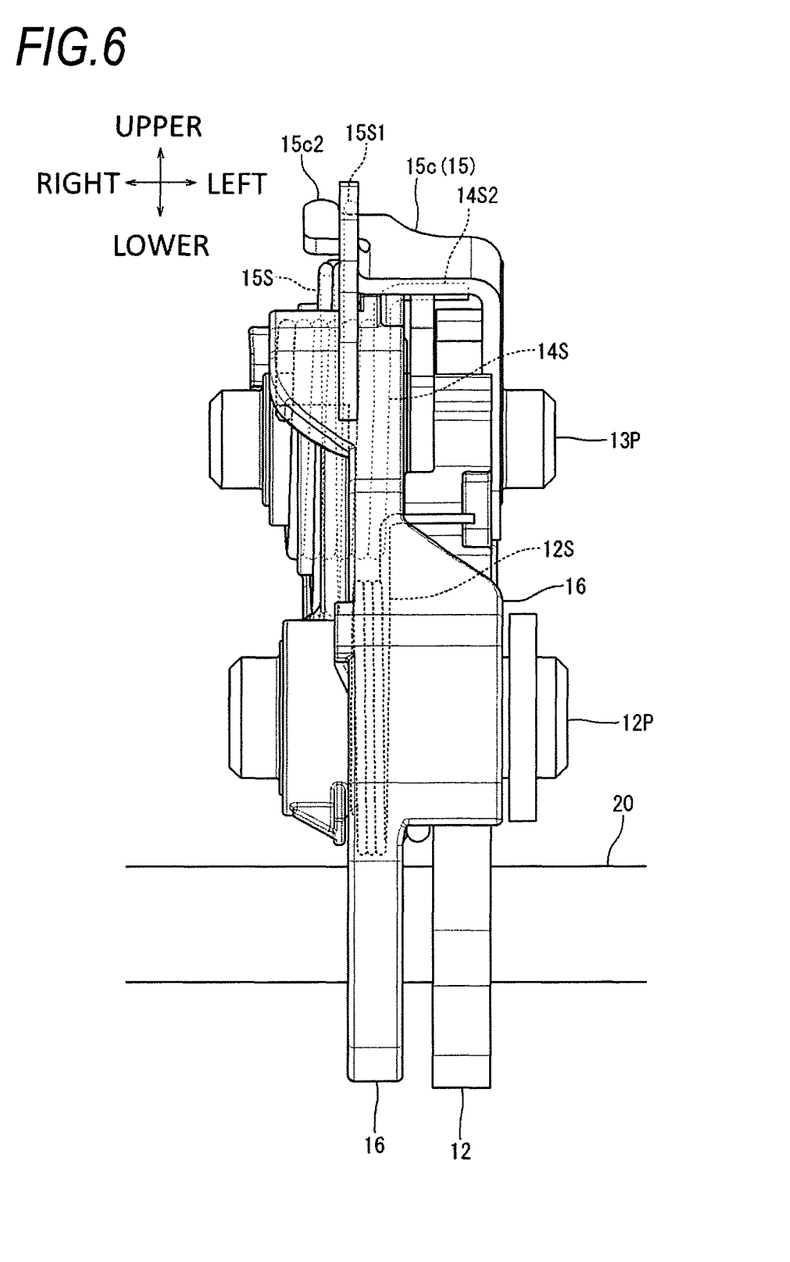
FIG. 6 is a front view of the locking device of the embodiment and a leg plate is omitted.

As shown in FIGS. 3 to 5, the lock mechanism 10 includes a leg plate 11, a hook 12 rotatably installed to the leg plate 11, a pawl 13, a cam 14, a release lever 15, and a case 16. Here, the leg plate 11 corresponds to the "base plate" in claims.

As shown in FIGS. 3 to 5, the leg plate 11 is formed into a substantially prismatic shape by assembling a right leg plate 11R and a left leg plate 11 L with a space provided therebetween. The right base plate 11R includes a substantially planar main body 11Ra, a front vertical wall 11Rb extending leftward from a front end of the main body 11Ra, and a rear vertical wall 11Rc extending leftward from a rear end of the main body 11Ra. The main body 11Ra in a long axis direction is inclined rearward in a side view, and is formed into a substantially rectangular shape with a length in a short axis direction on a lower end side of the main body 11Ra slightly larger than a length in the short axis direction on an upper end side of the main body 11Ra. A mounting hole 11Ra1 is provided on the upper end side of the main body 11Ra, and a recess 11Ra2 opened downward is provided on the lower end of the main body 11Ra. The recess 11Ra2 is formed by cutting out into a substantially inverted U-shape in a side view, so that the cylindrical front striker 20 extending in the left-right direction and fixed to the floor F can be received from below. Further, a hook shaft hole 11Ra3 is provided on the main body 11Ra on an upper front side of the recess 11Ra2, and a pawl shaft hole 11Ra4 is provided on the main body 11Ra on a rear upper side of the recess 11Ra2 and on a rear upper side of the hook shaft hole 11Ra3. In addition, a coupling pin hole 11Ra5 is provided on the main body 11 Ra on a rear upper side of the recess 11Ra2. An interference preventing member 11*d* made of resin is installed to an outer periphery of the recess 11Ra2 in order to prevent the right leg plate 11R from coming into direct contact with the front striker 20 and generating abnormal noise, for example.

As shown in FIGS. 3 to 5, the left base plate 11L includes a substantially planar main body 11La, a front vertical wall 11Lb extending rightward from a front end of the main body 11La, and a rear vertical wall 11Lc extending rightward from a rear end of the main body 11La. The main body 11La is formed into substantially the same shape as the main body 11Ra in a side view. A mounting hole 11La1 is provided on an upper end side of the main body 11La, and a recess 11La2 opened downward is provided on a lower end of the main body 11La. The recess 11La2 is formed by being cut out into a substantially inverted U-shape in a side view, so that the cylindrical front striker 20 extending in the left-right direction and fixed to the floor F can be received from below. Further, a hook shaft hole 11La3 is provided on the main body 11La on an upper front side of the recess 11La2, and a pawl shaft hole 11La4 is provided on the main body 11La on a rear upper side of the recess 11La2 and on a rear upper side of the hook shaft hole 11La3. In addition, a coupling pin hole 11La5 is provided on the main body 11La on a rear upper side of the recess 11La2. A stopper pin 11*c* for stopping rotation of the front leg 8 with respect to the bracket 5 provided on the cushion frame 4 is disposed on the main body 11La on a front lower side of the mounting hole 11La1 in a manner extending leftward. The right leg plate 11R and the left leg plate 11L are connected to each other by a hook shaft 12P, a pawl shaft 13P, and a coupling pin (not shown) described below, in a state where the front vertical wall 11Lb covers a front side of the front vertical wall 11Rb and the rear vertical wall 11Lc covers a rear side of the rear vertical wall 11Rc. Thus, the right leg plate 11R is assembled to the left leg plate 11L with the main body 11Ra facing the main body 11La, and a space is provided therebetween. As will be described below, a hook 12, a pawl 13, a cam 14, a release lever 15, and a case 16 are disposed in the space. In FIG. 2, the main body 11Ra and the main body 11La constitute the pair of sidewalls 8a, the front vertical wall 11Lb constitutes the front wall 8b, and the rear vertical wall 11Lc constitutes the rear wall 8c. A flanged round pipe-shaped spacer 11b is disposed between a periphery of the mounting hole 11Ra1 of the right leg plate 11R and a periphery of the mounting hole 11La1 of the left leg plate 11L. The assembled right leg plate 11R and left leg plate 11L are rotatably installed to the shaft holes 5a1 of the bracket 5 provided on the cushion frame 4 shown in FIG. 2 by a bolt (not shown) inserted through an inner cylindrical portion of the spacer 11b. At this time, a leg spring 11a, which is a torsion coil spring, is disposed coaxially with the leg rotation axis P between the right leg plate 11R and the left leg plate 11L which are assembled to the bracket 5. The assembled right leg plate 11R and left leg plate 11L are rotationally biased in a clockwise direction about the leg rotation axis P in FIG. 4, and the stopper pin 11c abuts on a lower end of the bracket 5 to stop rotation of the right leg plate 11R and the left leg plate 11L.

As shown in FIGS. 3 to 5, the hook 12 is a plate-shaped member, and is provided with a hook shaft hole 12a through which the hook shaft 12P is inserted substantially at a center of the hook 12 in the upper-lower direction. A hook portion 12b opened rearward and downward in a side view is provided on the hook 12 below the hook shaft hole 12a. A hook upper protrusion 12c protruding in a direction away from the hook shaft hole 12a is formed at an upper end of the hook portion 12b on an opening side. An upper end protrusion 12d protruding in a direction radially away from the hook shaft hole 12a is formed at the upper end of the hook 12. In the upper end protrusion 12d, a portion formed into an arc shape centered on a center of the hook shaft hole 12a in a side view is an upper end edge 12d1, and a portion extending from a rear end of the upper end edge 12d1 toward the hook upper protrusion 12c is an upper end side edge 12d2. The upper end side edge 12d2 is formed into a shape such that in a locked state described below in which the pawl 13 is engaged with the hook 12, the upper end side edge 12d2 faces a hook engaging portion 13b of the pawl 13 with a gap provided therebetween. A cam engaging protrusion 12e protruding rightward (toward the right leg plate 11R) is provided on a portion of the hook 12 between the upper end edge 12d1 and the hook shaft hole 12a. In the locked state described below in which the pawl 13 is engaged with the hook 12, a hook pressing portion 14b of the cam 14 abuts on and presses the cam engaging protrusion 12e, so that the hook 12 rotates counterclockwise about the hook shaft 12P in FIG. 4.

As shown in FIGS. 3 to 5, the hook 12 is installed to the leg plate 11 by the hook shaft 12P rotatably about an axis thereof. The hook shaft 12P is formed by a first cylindrical portion 12P1, a second cylindrical portion 12P2, a flange 12P3, a third cylindrical portion 12P4, and a fourth cylindrical portion 12P5, which are arranged in this order from the right side while each of the two adjacent portions is configured to have different diameter. The first cylindrical portion 12P1 and the fourth cylindrical portion 12P5 have the same diameter, and the second cylindrical portion 12P2 and the third cylindrical portion 12P4 have the same diameter. The flange 12P3, the second cylindrical portion 12P2 and the third cylindrical portion 12P4, and the first cylindrical portion 12P1 and the fourth cylindrical portion 12P5 are in descending order of diameter. As shown in FIG. 5, in a state where the third cylindrical portion 12P4 is inserted through the hook shaft hole 12a of the hook 12 and the second cylindrical portion 12P2 is inserted through a hook shaft support 16a of the case 16, the first cylindrical portion 12P1 is inserted through and caulked to the hook shaft hole 11Ra3 of the right leg plate 11R and the fourth cylindrical portion 12P5 is inserted through and caulked to the hook shaft hole 11La3 of the left leg plate 11L.

Figure 7:
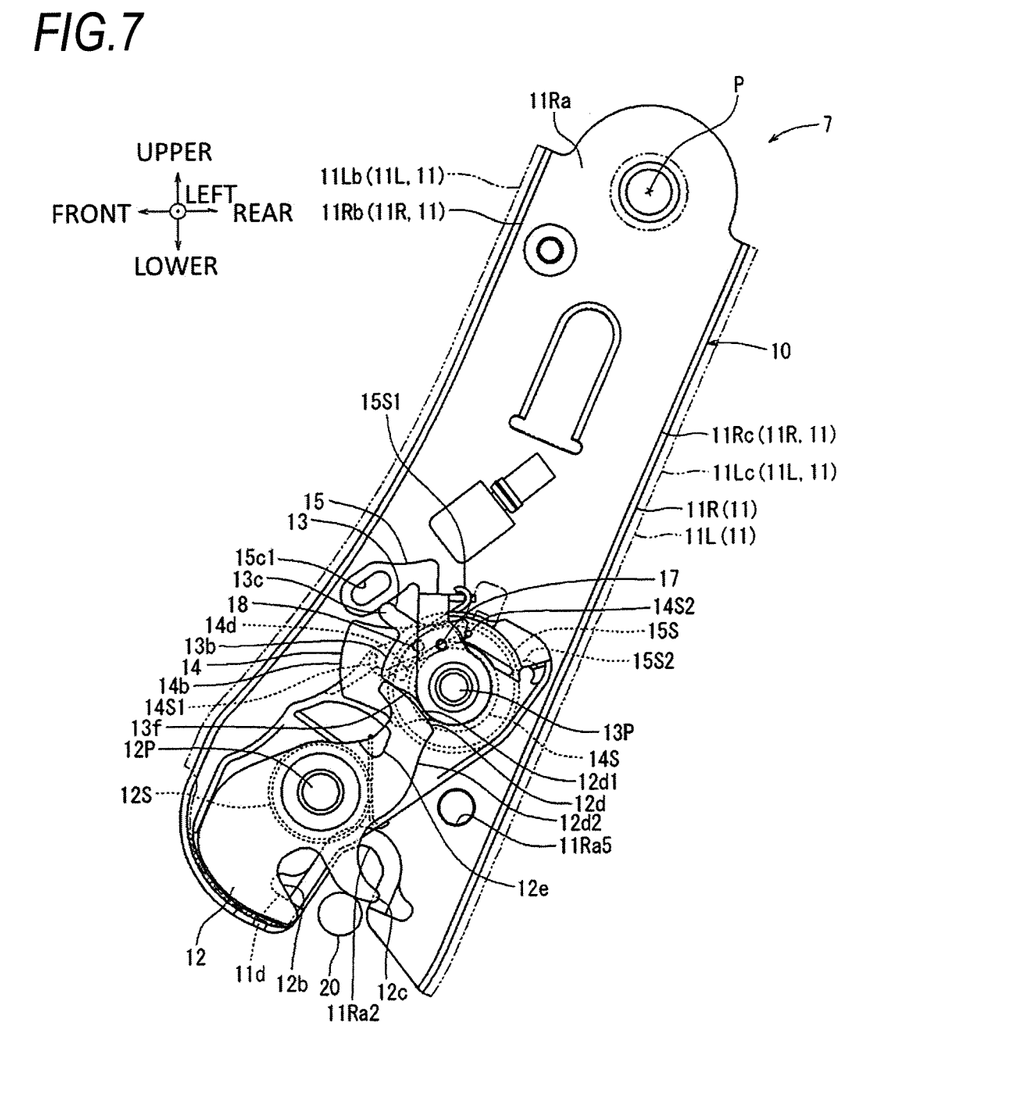
FIG. 7 is a side view of the locking device in an unlocked state of the embodiment, and a base plate on the front side is indicated by a two-dot chain line.

The hook 12 is rotationally biased clockwise about the hook shaft 12P in FIG. 4 by a hook spring 12S. One end of the hook spring 12S is locked on a surface on an opposite side of the upper end side edge 12d2 of the upper end protrusion 12d, and another end of the hook spring 12S is locked on the case 16. The hook spring 12S is a torsion coil spring, and is disposed so as to have a central axis of the coil coinciding with the hook shaft 12P. In FIG. 4, the hook portion 12b can be engaged with the front striker 20 received in the recess 11Ra2 and the recess 11La2 of the leg plate 11 by rotating counterclockwise about the hook shaft 12P of the hook 12. As shown in FIG. 4, in a state in which the hook portion 12b is engaged with the front striker 20, the hook forms the locked state in which the hook portion 12b, the recess 11Ra2 and the recess 11La2 hold the front striker 20. Further, as shown in FIG. 7, in a state in which the hook 12 is rotated clockwise about the hook shaft 12P by a rotationally biasing force of the hook spring 12S and the hook portion 12b is disengaged from the front striker 20, the hook portion 12b is separated from the recess 11Ra2 and the recess 11La2 and comes into the unlocked state. Here, the hook spring 12S corresponds to the "third torsion coil spring" in claims.

As shown in FIGS. 3 to 5, the pawl 13 is a plate-shaped member having a thickness slightly smaller than that of the hook 12, and a pawl shaft hole 13a through which the pawl shaft 13P is inserted is provided on a rear end side thereof. The pawl 13 includes a hook engaging portion 13b on a side thereof facing the hook 12. The hook engaging portion 13b is located so as to be engageable with the upper end side edge 12d2 of the hook 12 which is in the locked state where the hook 12 is locked to the front striker 20. A protrusion 13c extending and protruding in a radial direction from a center of the pawl shaft hole 13a is provided on an upper end side of the hook engaging portion 13b. At a position between the protrusion 13c and the pawl shaft hole 13a of the pawl 13 and close to the pawl shaft hole 13a, a coupling pin hole 13d for inserting and fixing a coupling pin 17 is provided. The coupling pin 17 is for coupling the pawl 13 with respect to the release lever 15 described below, so that the pawl 13 and the release lever 15 are relatively rotatable about the pawl shaft 13P. In addition, at a position between the protrusion 13c and the pawl shaft hole 13a of the pawl 13 and close to the protrusion 13c, an interlocking pin hole 13e for inserting and fixing an interlocking pin 18 is provided, so that the pawl 13 is relatively rotatable about the pawl shaft 13P with respect to the cam 14 described below at a predetermined angle. A hook abutting portion 13f is provided on the pawl 13 in a manner extending from a lower end of the hook engaging portion 13b toward a lower end of the pawl shaft hole 13a of the pawl 13. In the unlocked state shown in FIG. 7, the hook abutting portion 13f abuts on the upper end edge 12d1 of the hook 12 to stop counterclockwise rotation of the pawl 13 about the pawl shaft 13P.

As shown in FIGS. 3 to 5, the pawl 13 is installed to the leg plate 11 by the pawl shaft 13P, so as to be rotatable about an axis of the pawl shaft 13P. The pawl shaft 13P is formed by a first cylindrical portion 13P1, a second cylindrical portion 13P2, and a third cylindrical portion 13P3, which are arranged in this order from the right side while each of the two adjacent portions is configured to have different diameter. The first cylindrical portion 13P1 and the third cylindrical portion 13P3 have the same diameter, which is smaller than the diameter of the second cylindrical portion 13P2. As shown in FIG. 5, in a state where the second cylindrical portion 13P2 is inserted through a pawl shaft hole 15a of the release lever 15 described below, the pawl shaft hole 13a of the pawl 13, a cam shaft hole 14a of the cam 14 described below, and a pawl shaft support 16b of the case 16 described below, which are arranged from the left side, the first cylindrical portion 13P1 is inserted through and caulked to the pawl shaft hole 11Ra4 of the right leg plate 11R and the third cylindrical portion 13P3 is inserted through and caulked to the pawl shaft hole 11La4 of the left leg plate 11L.

As shown in FIGS. 3 to 6, since the release lever 15 described below is rotationally biased counterclockwise about the pawl shaft 13P in FIG. 4 by a release lever spring 15S, the pawl 13 is rotationally biased counterclockwise about the pawl shaft 13P in FIG. 4. The pawl 13 can abuse on and engage with the hook 12 by being rotationally biased. A structure for arranging the release lever spring 15S with respect to the release lever 15 will be described below. As shown in FIG. 4, in a state in which the hook portion 12b of the hook 12 is engaged with the front striker 20, the protrusion 13c of the pawl 13 abuts on the upper end edge 12d1 of the hook 12, to stop counterclockwise rotation of the pawl 13 about the pawl shaft 13P. At this time, the hook engaging portion 13b of the pawl 13 faces the upper end side edge 12d2 of the hook 12 with a gap provided therebetween. Further, as shown in FIG. 7, in a state in which the hook portion 12b is disengaged from the front striker 20, the hook abutting portion 13f of the pawl 13 abuts on the upper end edge 12d1 of the hook 12, to stop counterclockwise rotation about the pawl shaft 13P.

As shown in FIGS. 3 to 5, the cam 14 is a plate-shaped member having a thickness of about the half of the plate thickness of the hook 12. A cam shaft hole 14a through which the pawl shaft 13P is inserted is provided on a rear end side of the cam 14. The cam 14 is formed with a hook pressing portion 14b having a substantially arc shape centered on a center of the cam shaft hole 14a on a side thereof facing a side surface of the cam engaging protrusion 12e of the hook 12. Specifically, the hook pressing portion 14b has a curved surface shape having an angle so that hook pressing portion 14b gradually pushes the cam engagement projection portion 12e of the hook 12 toward a far side as counterclockwise rotation of the cam 14 about the pawl shaft 13P progresses in FIG. 4. A protrusion 14c extending from the center of the cam shaft hole 14a upward in the radial direction is provided on the upper end side of the cam 14. A rear end 14S2 of a cam spring 14S is engaged with the protrusion 14c. The cam 14 is rotationally biased counterclockwise about the pawl shaft 13P by the cam spring 14S in FIG. 4. An arc-shaped long hole 14d centered on the center of the cam shaft hole 14a is provided between the hook pressing portion 14b and the cam shaft hole 14a of the cam 14. An interlocking pin 18 extending rightward with respect to the pawl 13 (in a direction in which the cam 14 is overlapped) is loosely fitted in the long hole 14d. Thereby, the cam 14 is rotatable relative to the pawl 13 about the pawl shaft 13P, between an upper end and a lower end of the long hole 14d on which the interlocking pin 18 abuts. When the pawl 13 is rotated clockwise in FIG. 4 about the pawl shaft 13P, the cam 14 rotates clockwise in FIG. 4 about the pawl shaft 13P together with the pawl 13 from a state in which the interlocking pin 18 abuts on the upper end of the long hole 14d.

As shown in FIGS. 3 to 5, the cam 14 is installed to the leg plate 11 by the pawl shaft 13P so as to be rotatable about the axis of the pawl shaft 13P. Specifically, as shown in FIG. 5, the cam 14 is arranged at a position between the pawl 13 and the case 16. This position is a position where the hook pressing portion 14b of the cam 14 faces the side surface of the cam engaging protrusion 12e of the hook 12.

As shown in FIGS. 3 to 6, the cam 14 is rotationally biased counterclockwise in FIG. 4 about the pawl shaft 13P by the cam spring 14S. One end (i.e. rear end 14S2) of the cam spring 14S is locked to a rear surface of the protrusion Mc and another end (i.e. front end 14S1) is locked to the case 16 described below. The cam spring 14S is a torsion coil spring, and is disposed so as to have a central axis of the coil coinciding with the pawl shaft 13P. The coil of the cam spring 14S is formed so as to have a smaller diameter than the coil of the release lever spring 15S. The coil of the cam spring 14S is formed so as to have a smaller length in a direction of the central axis of the coil than the coil of the release lever spring 15S about twice. In a side view, the front end 14S1 of the cam spring 14S is provided on an outer side than the coil of the release lever spring 15S, and the rear end 14S2 of the cam spring 14S is provided on an inner side than the coil of the release lever spring 15S. As shown in FIG. 4, in a state in which the hook portion 12b of the hook 12 is engaged with the front striker 20, the hook pressing portion 14b of the cam 14 abuts on the cam engaging protrusion 12e of the hook 12 and rotates counterclockwise about the pawl shaft 13P, thereby pressing the cam engaging protrusion 12e and rotating the hook 12 counterclockwise in FIG. 4 about the hook shaft 12P. As a result, the lock mechanism 10 is in a locked state with respect to the front striker 20 by suppressing the backlash. Further, as shown in FIG. 7, in a state in which the hook portion 12b is disengaged from the front striker 20, the pawl 13 is rotated clockwise in FIG. 7 about the pawl shaft 13P by the release lever 15 described below. Then, the interlocking pin 18 abuts on the upper end of the long hole 14d, and the pawl 13 is further rotated. Thereby, the cam 14 is rotated clockwise in FIG. 7 about the pawl shaft 13P, and the hook pressing portion 14b is separated from the cam engaging protrusion 12e of the hook 12. In this state, rotation of the cam 14 due to the biasing force of the cam spring 14S is stopped. Here, the cam spring 14S corresponds to the "first torsion coil spring" in claims.

As shown in FIGS. 3 to 6, the release lever 15 is a member formed by locally bending a plate-shaped member. The release lever 15 includes a base 15b and an arm 15c. A lever shaft hole 15a through which the pawl shaft 13P is inserted is provided on the base 15b on a rear end side, and a coupling pin hole 15b1 for inserting and fixing the coupling pin 17 is provided on the base 15b between the arm 15c and the lever shaft hole 15a. At an upper front end of the base 15b, the arm 15c extending rightward and extending from a right end in a substantially arc shape about a center of the lever shaft hole 15a is disposed in parallel with the base 15b. A long hole 15c1 for attaching an end of an operation cable (not shown) for rotating the release lever 15 about the pawl shaft 13P is provided on a tip end side of the arm 15c. A spring locking portion 15c2 for locking one end (i.e. front end 15S1) of the release lever spring 15S is provided on a portion extending rightward from the arm 15c.

As shown in FIGS. 3 to 5, the release lever 15 is installed to the leg plate 11 the pawl shaft 13P so as to be rotatable about an axis of the pawl shaft 13P. Specifically, as shown in FIG. 5, the release lever 15 is arranged at a position sandwiched between the pawl 13 and the left leg plate 11L.

The release lever 15 is connected to the pawl 13 by the coupling pin 17, and is rotatable about the pawl shaft 13P together with the pawl 13.

As shown in FIGS. 3 to 6, the release lever 15 is rotationally biased counterclockwise in FIG. 4 about the pawl shaft 13P by the release lever spring 15S. One end (i.e. front end 15S1) of the release lever 15 is locked to a rear surface of the spring locking portion 15c2, and another end (i.e. rear end 15S2) of the release lever 15 is locked to the case 16. The release lever spring 15S is a torsion coil spring, and is disposed so as to have a center axis of a coil coinciding with the pawl shaft 13P. The coil of the release lever spring 15S is formed so as to have a larger diameter than the coil of the cam spring 14S. The coil of the release lever spring 15S is formed so as to have a smaller length in a central axis direction than the coil of the cam spring 14S. The coil of the release lever spring 15S has a length, in the central axis direction, of about the half of the coil of the cam spring 14S. As shown in FIG. 4, in a state in which the hook portion 12b of the hook 12 is engaged with the front striker 20, the release lever 15 is released from traction of the operation cable, rotated counterclockwise about the pawl shaft 13P due to a rotational biasing force of the release lever spring 15S, and rotation of the release lever 15 is stopped in a state where the operation cable is stretched. At this time, a rotation of the pawl 13 is also stopped together with the release lever 15, and the interlocking pin 18 is positioned in the long hole 14d of the cam 14 so as to allow the cam 14 to rotate counterclockwise about the pawl shaft 13P. Further, as shown in FIG. 7, in a state in which the hook portion 12b is disengaged from the front striker 20, the release lever 15 is rotated clockwise about the pawl shaft 13P due to traction of the operation cable. Then, the interlocking pin 18 abuts on the upper end of the long hole 14d and thus the cam 14 is further rotated. Thereby, the cam 14 is rotated clockwise about the pawl shaft 13P, and the hook pressing portion 14b is separated from the cam engaging protrusion 12e of the hook 12. In this state, rotation of the cam 14 due to the biasing force of the cam spring 14S is stopped. Here, the release lever spring 15S corresponds to the "second torsion coil spring" in claims.

As shown in FIGS. 3 to 6, the case 16 is a box-shaped resin member opened leftward and covers an outer periphery of the hook shaft 12P and an outer periphery of the pawl shaft 13P in a side view. A cylindrical hook shaft support 16a supporting the hook shaft 12P inserted through an inner cylindrical portion thereof is provided on the case 16 on a lower side. A cylindrical pawl shaft support 16b supporting the pawl shaft 13P inserted through an inner cylindrical portion thereof is provided on the case 16 on an upper side. The cylindrical hook shaft support 16a and the cylindrical pawl shaft support 16b extend rightward. On an outer periphery side of the pawl shaft support 16b, a coaxial cylindrical spring support wall 16c is provided in a manner extending rightward. The hook spring 12S is provided on the case 16 in a state where an inner surface of the coil of the hook spring 12S faces an outer cylinder side of the hook shaft support 16a. The hook shaft support 16a is disposed between the flange 12P3 and the right leg plate 11R in a state where the second cylindrical portion 12P2 of the hook shaft 12P is inserted through the hook shaft support 16a. The cam spring 14S is provided on the case 16 in a state where an inner surface of the coil of the cam spring 14S faces an outer cylinder side of the pawl shaft support 16b. The pawl shaft support 16b is disposed between the cam 14 and the right leg plate 11R in a state where the second cylindrical portion 13P2 of the pawl shaft 13P is inserted through the pawl shaft support 16b. The release lever spring 15S is provided on the case 16 in a state where an inner surface of the coil of the release lever spring 15S faces an outer cylinder side of the spring support wall 16c. That is, a central axis of the pawl shaft support 16b, a central axis of the coil of the cam spring 14S, a central axis of the spring support wall 16c, and a center axis of the coil of the release lever spring 15S are arranged coinciding with the central axis of the hook shaft 12P, in an order radially outward from the central axis of the hook shaft 12P to the pawl shaft support 16b, the cam spring 14S, the spring support wall 16c, and the release lever spring 15S. When viewed in an extending direction of the hook shaft 12P, the front end 14S1 of the cam spring 14S protrudes to a radially outer side than an outer surface of the coil of the release lever spring 15S. However, since the length in the central axis direction of the coil of the cam spring 14S is about twice the length in the central axis direction of the coil of the release lever spring 15S, the front end 14S1 of the cam spring 14S can be locked to the case 16 without being interfered with the release lever spring 15S. Here, the spring support wall 16c corresponds to the "support wall" in claims. The case 16 corresponds to the "case member" in claims. The front end 14S1 corresponds to the "one end" in claims.

As shown in FIGS. 2 and 3, the front striker 20 is a member obtained by bending a metal round bar into a substantially U-shape in a front view and fixing an opening end side thereof to the floor F. A portion of the front striker 20 extending in the left-right direction is received by the recess 11Ra2 and the recess 11La2 of the leg plate 11, and the hook portion 12b of the hook 12 is engaged from below to come into the locked state.

Operation of the locking device 7 will be described with reference to FIGS. 4 and 7. FIG. 4 shows a state in which the locking device 7 is in the locked state in a state where the seat back 3 is in an upright position with respect to the seat cushion 2 (see FIG. 1). The upper surface of the hook portion 12b is in contact with the lower surface of the front striker 20, and the hook 12, the recess 11Ra2 of the right leg plate 11R and the recess 11La2 of the left leg plate 11L hold the front striker 20. The pawl 13 is rotationally biased counterclockwise in FIG. 4 about the pawl shaft 13P via the release lever 15, and the protrusion 13c abuts on the upper end edge 12d1 of the hook 12 to stop rotation of the pawl 13. At this time, the hook engaging portion 13b of the pawl 13 faces the upper end side edge 12d2 of the hook 12 with a gap provided therebetween. Thereby, even if the cam 14 is deformed by application of a large load, it is possible to suppress clockwise rotation of the hook 12 about the hook shaft 12P. The cam 14 is rotationally biased by the cam spring 14S counterclockwise about the pawl shaft 13P in FIG. 4, and pushes the hook pressing portion 14b against the cam engaging protrusion 12e of the hook 12, so as to press the hook 12 in a direction in which the hook 12 holds the front striker 20. As a result, the lock mechanism 10 is in a locked state with respect to the front striker 20 by suppressing the backlash.

In a state where the locking device 7 is in the locked state as shown in FIG. 4, when the seat back 3 is at a folded position laid down and overlapped with respect to the seat cushion 2, an operation cable (not shown) is pulled to rotate the release lever 15 clockwise about the pawl shaft 13P in FIG. 4. Then, the pawl 13 is rotated clockwise about the pawl shaft 13P together with the release lever 15. Due to such rotation of the pawl 13, the interlocking pin 18 comes into contact with the upper end of the long hole 14d, the cam 14 is rotated clockwise about the pawl shaft 13P in FIG. 7, and the hook pressing portion 14b is separated from the cam engaging protrusion 12e of the hook 12. Then, the hook 12 rotates clockwise about the hook shaft 12P in FIG. 7by the rotational biasing force of the hook spring 12S, and the hook portion 12b is retracted from the recess 11Ra2 of the right leg plate 11R and the recess 11La2 of the left leg plate 11L and thus is disengaged from the front striker 20. Simultaneously, the lower surface of the hook upper protrusion 12c of the hook 12 abuts on and presses the upper surface of the front striker 20, and the recess 11Ra2 of the right leg plate 11R and the recess 11La2 of the left leg plate 11L are separated upward from the front striker 20. In this way, as shown in FIG. 7, the lock mechanism 10 comes into the unlocked state disengaged from the front striker 20.

Operation from the unlocked state shown in FIG. 7 to the locked state shown in FIG. 4 is vice versa. That is, in the state shown in FIG. 7, when the lock mechanism 10 is pushed onto the front striker 20, the upper surface of the front striker 20 presses the lower surface of the hook upper protrusion 12c of the hook 12 upward. Therefore, the hook 12 rotates counterclockwise about the hook shaft 12P in FIG. 7, and the hook portion 12b comes into contact with the lower surface of the front striker 20. In this state, when the seat back 3 is raised to the standing position with respect to the seat cushion 2, traction of the operation cable (not shown) is released, and the release lever 15 is rotated clockwise about the pawl shaft 13P in FIG. 7. Then, the pawl 13 rotates counterclockwise about the pawl shaft 13P together with the release lever 15, so that the protrusion 13c comes into contact with the upper end edge 12d1 of the hook 12 to stop rotation of the pawl 13, and the hook engaging portion 13b moves to a position facing the upper end side edge 12d2 of the hook 12 with a gap provided therebetween. Further, the cam 14 rotates counterclockwise about the pawl shaft 13P by the rotational biasing force of the cam spring 14S while the hook pressing portion 14b being pushed onto the cam engagement projection portion 12e of the hook 12, so as to press the hook 12 in the direction in which the hook 12 holds the front striker 20. As a result, the lock mechanism 10 comes into a state locked to the front striker 20 with rattling suppressed.

The present embodiment configured as described above has the following advantageous effects. The coil of the release lever spring 15S has the same center axis as the coil of the cam spring 14S, which coincides with the pawl shaft 13P. The coil of the release lever spring 15S has a smaller length in the direction of the central axis of the coil than the coil of the cam spring 14S. Also, the front end 14S1 of the cam spring 14S is provided on a radially outer side than the coil of the release lever spring 15S. Thereby, the outer diameter surface of the coil of the cam spring 14S and the inner diameter surface of the coil of the release lever spring 15S can be set close to each other so as to set the diameter of the coil of the release lever spring 15S small. As a result, increase in the size of the lock mechanism 10 can be suppressed.

Since the hook 12 is also rotationally biased with respect to the leg plate 11 by the hook spring 12S and the central axis of the coil of the hook 12 is the hook shaft 12P, increase in the size of the lock mechanism 10 can be further suppressed. Further, the cylindrical spring support wall 16c is disposed between the coil of the cam spring 14S and the coil of the release lever spring 15 S, and the central axis of the cylindrical spring support wall 16c is the pawl shaft. Accordingly, when the cam spring 14S and the release lever spring 15S are twisted and deformed, the coils thereof can be prevented from interfering with each other and the rotational biasing force can be applied to the pawl 13 and/or the cam 14 more smoothly. In addition, since the spring support wall 16c is formed integrally with the case 16 installed to the leg plate 11 while holding the cam spring 14S and the release lever spring 15S in the periphery of the pawl shaft 13P, the lock mechanism 10 has good assembling workability. Further, the front striker 20 can be provided on the floor F and the locking device 7 can be provided on the automobile seat 1. Also, the outer surface of the coil of the cam spring 14S can face the inner surface of the coil of the release lever spring 15S.

Although specific embodiments have been described above, the disclosure is not limited to the appearance and configuration thereof, and various modifications, additions, and deletions may be made without departing from the scope of the disclosure. Examples thereof include the following.

Although the locking device 7 is configured by the front leg 8 and the front striker 20 in the above embodiment, the disclosure is not limited thereto, and may be applied to the rear leg and the rear striker. Further, the disclosure may be applied to a locking device that couples a seat back to an automobile body. In addition, the disclosure can also be applied to seats mounted on airplanes, ships, trains and the like other than automobile seats.

Although the pawl 13 is configured to be rotationally biased via the release lever 15 in the above embodiment, the pawl 13 is not limited thereto, and may be directly biased by a torsion coil spring with respect to the leg plate 11.

What is claimed is:
1. A locking device for a vehicle seat capable of holding the vehicle seat with respect to a vehicle body, the locking device comprising:
   a striker provided on one of the vehicle body and the vehicle seat, and
   a lock mechanism provided on another of the vehicle seat and the vehicle body,
   wherein the lock mechanism includes:
      a base plate having a recess capable of receiving the striker;
      a hook supported rotatably by a hook shaft with respect to the base plate and capable of forming a locked state in which the hook and the recess hold the striker and an unlocked state in which the hook and the recess do not hold the striker, the hook being rotationally biased in a direction of forming the unlocked state;
      a pawl supported rotatably by a pawl shaft with respect to the base plate and maintaining the hook in the locked state by engaging with the hook, the pawl being rotationally biased in a direction of engaging with the hook; and
      a cam supported rotatably by the pawl shaft with respect to the base plate and configured to rotate so as to press the hook in the locked state in a locking direction,
   wherein one of the pawl and the cam is rotationally biased by a first torsion coil spring, a central axis of a coil of the first torsion coil spring being the pawl shaft,
   wherein another of the cam and the pawl is rotationally biased by a second torsion coil spring, a central axis of a coil of the second torsion coil spring being the pawl shaft,
   wherein the coil of the second torsion coil spring has a larger diameter than the coil of the first torsion coil spring and the coil of the second torsion coil spring has a smaller length in a direction of the central axis of the coil than the coil of the first torsion coil spring, and wherein at least one end of the first torsion coil spring is provided on a radially outer side than the coil of the second torsion coil spring.

2. The locking device for a vehicle seat according to claim 1,
wherein the hook is rotationally biased with respect to the base plate by a third torsion coil spring, a central axis of a coil of the third torsion coil spring being the hook shaft.

3. The locking device for a vehicle seat according to claim 1,
wherein a cylindrical support wall is disposed between the coil of the first torsion coil spring and the coil of the second torsion coil spring, a central axis of the cylindrical support wall being the pawl shaft.

4. The locking device for a vehicle seat according to claim 3,
wherein the support wall is formed integrally with a case member installed to the base plate while holding the first torsion coil spring and the second torsion coil spring in a periphery of the pawl shaft.

5. The locking device for a vehicle seat according to claim 1,
wherein the striker is provided on the vehicle body and the lock mechanism is provided on the vehicle seat.

6. The locking device for a vehicle seat according to claim 1,
wherein an outer surface of the coil of the first torsion coil spring faces an inner surface of the coil of the second torsion coil spring.

* * * * *